United States Patent
Atkinson et al.

(10) Patent No.: US 10,528,332 B2
(45) Date of Patent: *Jan. 7, 2020

(54) SYSTEMS AND METHODS FOR BUILDING GENERIC CI/CD PIPELINES

(71) Applicant: Capital One Services, LLC, McLean, VA (US)

(72) Inventors: Brandon Atkinson, North Chesterfield, VA (US); Christopher Bowers, Midlothian, VA (US); Dallas Edwards, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,530

(22) Filed: Mar. 18, 2019

(65) Prior Publication Data

US 2019/0303119 A1    Oct. 3, 2019

Related U.S. Application Data

(63) Continuation of application No. 16/151,528, filed on Oct. 4, 2018, now Pat. No. 10,275,231, which is a
(Continued)

(51) Int. Cl.
*G06F 9/44* (2018.01)
*G06F 8/60* (2018.01)
(Continued)

(52) U.S. Cl.
CPC .............. *G06F 8/60* (2013.01); *G06F 8/71* (2013.01); *G06F 9/455* (2013.01); *G06F 9/544* (2013.01);
(Continued)

(58) Field of Classification Search
CPC ....................................................... G06F 9/44
See application file for complete search history.

(56) References Cited

U.S. PATENT DOCUMENTS 9,823,950 B1    11/2017  Carrier et al.
2011/0307951 A1*  12/2011  Yermakov ........... H04L 63/0227
                                                    726/12
(Continued)

FOREIGN PATENT DOCUMENTS

WO    2015/112170 A1    7/2015

OTHER PUBLICATIONS

Jez Humble et al; "Continuous delivery (Chapter 5: Anatomy of the Deployment Pipeline)", Aug. 2010, pages I, II, 105-141.
(Continued)

*Primary Examiner* — Jae U Jeon
(74) *Attorney, Agent, or Firm* — DLA Piper LLP US

(57) ABSTRACT

At least one application may include instructions comprising application instructions and a plurality of separate pipeline definition instructions. The application instructions may be within a virtual container including at least one program that is generically executable in a plurality of different continuous integration and delivery (CI/CD) environments. Each of the plurality of separate pipeline definition instructions may be configured for each of the plurality of different CI/CD environments such that each pipeline definition may operate only in the CI/CD environment for which it is created. Each pipeline definition may be configured to cause the CI/CD environment for which it is created to execute the at least one program.

20 Claims, 4 Drawing Sheets

Related U.S. Application Data continuation of application No. 15/938,833, filed on Mar. 28, 2018, now Pat. No. 10,120,670.

(51) Int. Cl.
    *G06F 9/54*     (2006.01)
    *G06F 11/36*     (2006.01)
    *G06F 8/71*     (2018.01)
    *G06F 9/455*     (2018.01)

(52) U.S. Cl.
    CPC ...... *G06F 11/3664* (2013.01); *G06F 11/3688* (2013.01)

(56) References Cited

U.S. PATENT DOCUMENTS

| | | | | |
|---|---|---|---|---|
| 2013/0227573 | A1* | 8/2013 | Morsi | G06F 9/5083 |
| | | | | 718/100 |
| 2013/0311890 | A1* | 11/2013 | Cui | G06F 9/45529 |
| | | | | 715/736 |
| 2015/0244811 | A1* | 8/2015 | Zhu | G06F 9/00 |
| | | | | 709/228 |
| 2017/0010889 | A1 | 1/2017 | Spektor et al. | |

OTHER PUBLICATIONS

European Search Report from EP Application No. 19165992.9 dated Sep. 13, 2019.

\* cited by examiner

SYSTEMS AND METHODS FOR BUILDING GENERIC CI/CD PIPELINES

CROSS-REFERENCE TO RELATED APPLICATION INFORMATION

This is a continuation of U.S. patent application Ser. No. 16/151,528, filed Oct. 4, 2018, which is a continuation of U.S. patent application Ser. No. 15/938,833, filed Mar. 28, 2018, now U.S. Pat. No. 10,120,670, the entireties of which are incorporated herein by reference.

BACKGROUND

Software developers often use continuous integration and delivery (CI/CD) pipelines to deliver code to web hosting environments and/or other cloud computing platforms. These pipelines are usually specific to a single application and executed using a CI/CD tool like Jenkins, Circle CI, or TeamCity. These tools may perform similar functions, but may do so using specific and/or proprietary code. In addition, many applications depend upon specific versions of software in order to be built, tested, and deployed. These dependencies must exist wherever a CI/CD tool is used to automate these operations. Accordingly, if a developer wishes to use a new CI/CD tool, they must rewrite the much of the pipeline code and ensure all of an application's dependencies are met in order to achieve the same level of functionality.

An example pipeline development and/or deployment process is as follows. A developer writes pipeline code encapsulated in one or more files that are tailored for a CI/CD platform (e.g., Jenkinsfile, circle.yml, .drone.yml, etc.). The files are sent to a build server that uses a specific CI/CD platform. The build server maintains a separate set of software to support each pipeline, for example including CI/CD platform instances, build automation software, compilers, code analysis tools, deployment tools, web browsers, etc. Every pipeline deployed by the build server has its own set of this software. If the pipeline is migrated to a different CI/CD platform, a new file must be written, and the new build server must deploy a new set of software to support the pipeline.

SUMMARY OF THE DISCLOSURE

Systems and methods described herein may enable creation, testing, and/or deployment of generic pipelines, providing the ability to easily switch between CI/CD tools. Pipelines may be placed in containers that are portable to different CI/CD tools. The pipelines themselves may include generic scripts that can operate on a variety of different applications. For example, a pipeline may use the same code to run a security scan on both a Java application and a Python application. Containers may be delivered to each CI/CD tool's environment with scripts enabling the specific code of the environment to work with the generic containerized pipeline, for example.

For example, a method of deploying an application may include creating, by a processor, a virtual container including at least one program that is generically executable in a plurality of different CI/CD environments. The method may include creating, by the processor, a separate pipeline definition for each of the plurality of different CI/CD environments. Each pipeline definition may be configured to operate only in the CI/CD environment for which it is created, and each pipeline definition may be configured to cause the CI/CD environment for which it is created to execute the at least one program. The method may include deploying, by the processor, at least one of the pipeline definitions along with the virtual container in the CI/CD environment for which the at least one of the pipeline definitions is created, thereby enabling execution of the at least one program within the CI/CD environment for which the at least one of the pipeline definitions is created.

In some embodiments, the creating of the virtual container may include incorporating at least one utility library into the at least one program. The at least one utility script library include instructions for at least one generic application task. In some embodiments, the processor may create the at least one utility library.

In some embodiments, the creating of the virtual container may include incorporating at least one stage script into the at least one program. The at least one stage script may include instructions for at least one application task specific to the at least one program. In some embodiments, the processor may create the at least one stage script. In some embodiments, the creating of the virtual container may further include incorporating at least one utility library into the at least one program. The at least one utility library may include instructions for at least one generic application task, and the at least one stage script may ingest at least a portion of the at least one utility library to provide the at least one application task specific to the at least one program.

In some embodiments, the creating of each separate pipeline definition may include creating a build script for the CI/CD environment for which the separate pipeline definition is created. The build script may be configured to cause the CI/CD environment to cause the at least one program to execute within the virtual container.

In some embodiments, at least one of the plurality of different CI/CD environments may include a local development environment, and the deploying may include testing the at least one program in the local development environment prior to deploying the at least one program in at least one of the plurality of different CI/CD environments separate from the local development environment.

In another example, a non-transitory computer-readable medium may include instructions that, when executed by a processor, cause the processor to deploy at least one application. The instructions may include application instructions within a virtual container including at least one program that is generically executable in a plurality of different CI/CD environments. The instructions may include a plurality of separate pipeline definition instructions for each of the plurality of different CI/CD environments, each pipeline definition being configured to operate only in the CI/CD environment for which it is created, and each pipeline definition being configured to cause the CI/CD environment for which it is created to execute the at least one program.

In some embodiments, the at least one program may include at least one utility library. The at least one utility library may include instructions for at least one generic application task.

In some embodiments, the at least one program may include at least one stage script. The at least one stage script may include instructions for at least one application task specific to the at least one program. In some embodiments, the at least one program may further include at least one utility library. The at least one utility library may include instructions for at least one generic application task, and the at least one stage script may ingest at least a portion of the at least one utility library to provide the at least one application task specific to the at least one program.

In some embodiments, each separate pipeline definition may include a build script for the CI/CD environment for which the separate pipeline definition is configured. The build script may be configured to cause the CI/CD environment to cause the at least one program to execute within the virtual container.

In some embodiments, at least one of the plurality of different CI/CD environments may include a local development environment. The instructions may further include instructions for testing the at least one program in the local development environment prior to deploying the at least one program in at least one of the plurality of different CI/CD environments separate from the local development environment.

In another example, an application development device may include a processor and a non-transitory memory in communication with the processor. The memory may include instructions that, when executed by the processor, cause the processor to perform processing. The processing may include creating a virtual container including at least one program that is generically executable in a plurality of different CI/CD environments. The processing may include creating a separate pipeline definition for each of the plurality of different CI/CD environments, each pipeline definition being configured to operate only in the CI/CD environment for which it is created, and each pipeline definition being configured to cause the CI/CD environment for which it is created to execute the at least one program. At least one of the plurality of different CI/CD environments may include a local development environment. The instructions may include operating the local development environment, wherein the operating may include testing the at least one program in the local development environment prior to deploying the at least one program in at least one of the plurality of different CI/CD environments separate from the local development environment.

In some embodiments, the instructions may further cause the processor to perform processing including deploying at least one of the pipeline definitions along with the virtual container in the CI/CD environment for which the at least one of the pipeline definitions is created, thereby enabling execution of the at least one program within the CI/CD environment for which the at least one of the pipeline definitions is created.

In some embodiments, the local development environment may be configured to enable creation and selection of at least one utility library for the at least one program. The at least one utility library may include instructions for at least one generic application task.

In some embodiments, the local development environment may be configured to enable creation and selection of at least one stage script for the at least one program. The at least one stage script may include instructions for at least one application task specific to the at least one program. In some embodiments, the local development environment may be further configured to enable creation and selection of at least one utility library for the at least one program. The at least one utility library may include instructions for at least one generic application task, and the at least one stage script may ingest at least a portion of the at least one utility library to provide the at least one application task specific to the at least one program.

In some embodiments, each separate pipeline definition may include a build script for the CI/CD environment for which the separate pipeline definition is created, the build script being configured to cause the CI/CD environment to cause the at least one program to execute within the virtual container.

DETAILED DESCRIPTION OF SEVERAL EMBODIMENTS

Systems and methods described herein may enable creation, testing, and/or deployment of generic pipelines, providing the ability to easily switch between CI/CD tools. Pipelines may be placed in containers that are portable to different CI/CD tools. The pipelines themselves may include generic scripts that can operate on a variety of different applications and may include generic and/or specific code that makes the pipeline functionality work. Containers may be delivered to each CI/CD tool's environment with scripts enabling the specific code of the environment to work with the generic containerized pipeline, for example. Once a pipeline is prepared and placed in a container, the container and a build script may be distributed to a build server. The build server may use only the CI/CD platform (e.g., without additional support software) to execute the build script and thereby cause the pipeline to function.

Figure 1:
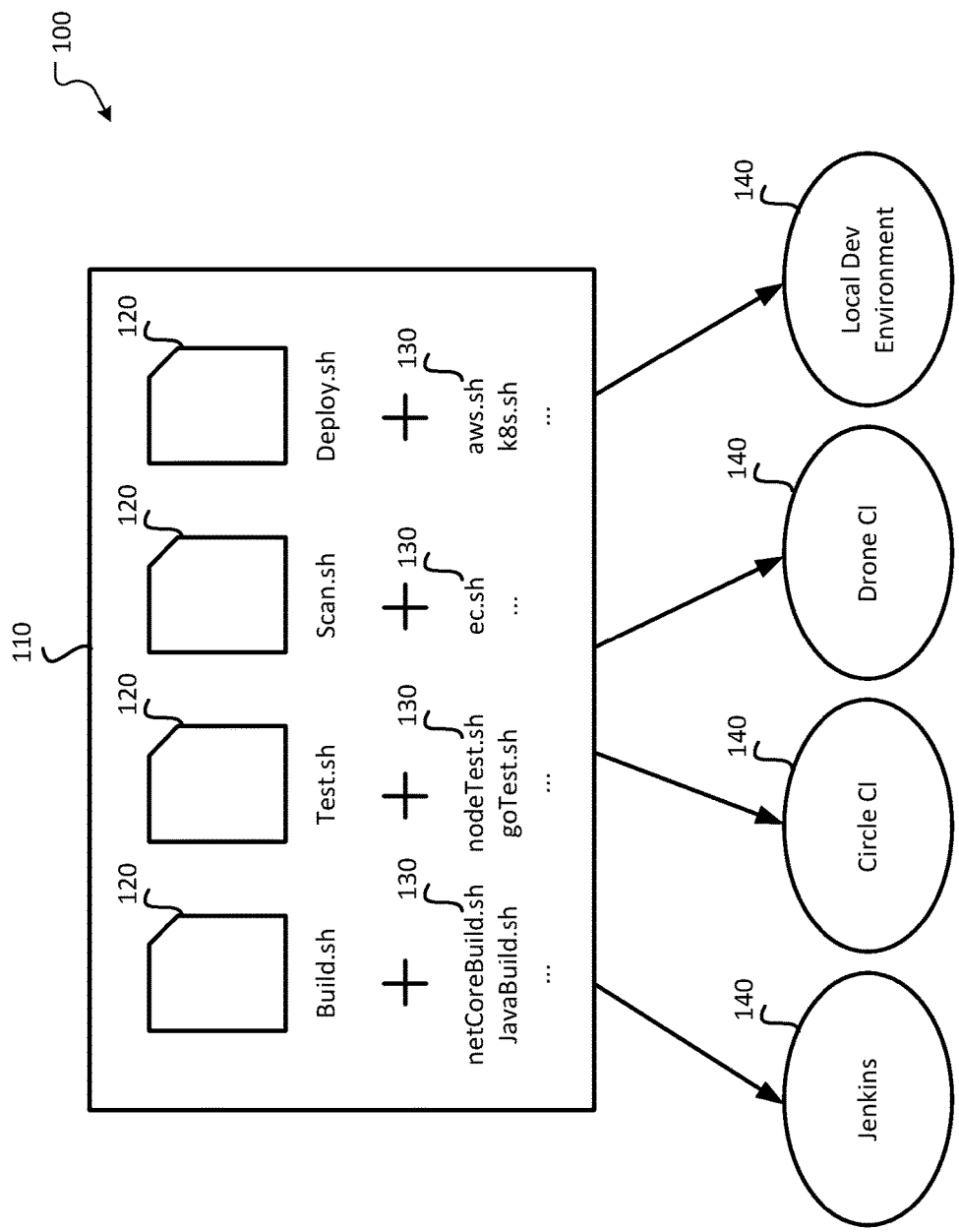
FIG. 1 shows a generic CI/CD pipeline according to an embodiment of the present disclosure.

FIG. 1 shows a generic CI/CD pipeline 100 according to an embodiment of the present disclosure. Pipeline 100 may include one or more containers 110. For example, container 110 may be a Docker™ container or other container type (e.g., RXT, LXC, or any other container). Container 110 may contain a complete program, such as a pipeline, and may utilize a host device's operating system, as opposed to containing a complete virtual machine with its own operating system, in some embodiments. In such cases, container 110 may be distributed with a build script or other data set allowing the host operating system to interact with the pipeline inside container 110.

Within container 110, the application may be pipeline from one or more scripts and/or libraries. For example, these scripts may include utility libraries 120 and/or stage scripts 130. Utility libraries 120 may include scripts that are useful for a plurality of different pipelines and can be reused for different pipelines. For example, many CI/CD pipelines may require build scripts, test scripts, security scan scripts, and/or deployment scripts. Accordingly, a set of reusable utility libraries 120 may be provided to enable common functionality. In the example container 110 of FIG. 1, the pipeline uses a build.sh utility library 120, a test.sh utility library 120, a scan.sh utility library 120, and a deploy.sh utility library 120.

Beyond the generally applicable functionality provided by utility libraries 120, each pipeline may have specific and/or unique functionality requiring non-standard code. Stage scripts 130 may define an overall pipeline flow and may call on utility libraries 120 to perform their functionality at appropriate points in the flow. In some embodiments, stage scripts 130 may ingest utility libraries 120 to enable at least a portion of the functionality provided by stage scripts

130. For example, a stage script 130 configured to perform a specific security scan function at a specific point in the pipeline flow may ingest some or all of the code from a security scan utility library 120 (e.g., scan.sh) and add additional code to the ingested code to provide the added functionality. In the example container 110 of FIG. 1, stage scripts 130 netCoreBuild.sh and JavaBuild.sh ingest build.sh utility library 120 (e.g., to provide specific build features starting from the generic build.sh build features). Stage scripts 130 nodeTest.sh and goTest.sh ingest test.sh utility library 120 (e.g., to provide specific test features starting from the generic test.sh test features). Stage script 130 ec.sh ingests scan.sh utility library 120 (e.g., to provide specific scanning features starting from the generic scan.sh scanning features). Stage scripts 130 aws.sh and k8s.sh ingest deploy.sh utility library 120 (e.g., to provide specific deployment features starting from the generic deploy.sh deployment features). The utility libraries and stage scripts described herein are examples only, and those of ordinary skill in the art will appreciate that any functionality may be provided by utility libraries and stage scripts (e.g., whitesource, artifactory, sonatype, aws, azure, gcp, etc.).

The pipeline inside container 110 may be written in a generic language (e.g., Python, Bash, Shell, etc.). For example, utility libraries 120 and stage scripts 130 may be written in a generic language. Accordingly, the pipeline may be run by any Linux-based operating system and/or other operating systems. This may allow container 110 to be delivered within a variety of CI/CD platforms. For example, as shown in FIG. 1, container 110 may be used with Jenkins™, Circle CI™, Drone CI™, and/or other platforms 140. One platform 140 illustrated in FIG. 1 is a local development environment platform 140. Container 110 may run within a local development environment for simulation and/or testing purposes.

To facilitate execution of the pipeline inside container 110 in a specific environment, container 110 may be distributed in each CI/CD platform with an associated build script written for the specific platform. For example, the same container 110 may be distributed with a Jenkins™-specific build script when sent to Jenkins' platform 140, a Circle™-specific build script when sent to Circle CI™ platform 140, and/or a Drone™-specific build script when sent to Drone CI™ platform 140. These build scripts may be written in the specific language of the specific environment and may include commands causing execution of the code inside container 110. Accordingly, the same container 110 can be sent to any platform 140, and the only thing that may be changed is a build script distributed with container 110. This may be contrasted with other pipelines written for CI/CD platforms, wherein some or all of the pipeline itself (whether within a container or not) must be customized for each environment. In the example of FIG. 1, container 110 contains everything it needs to perform the desired processing (written in a generic language), and the only thing that may vary is a build script triggering execution of what is inside container 110.

Figure 2:
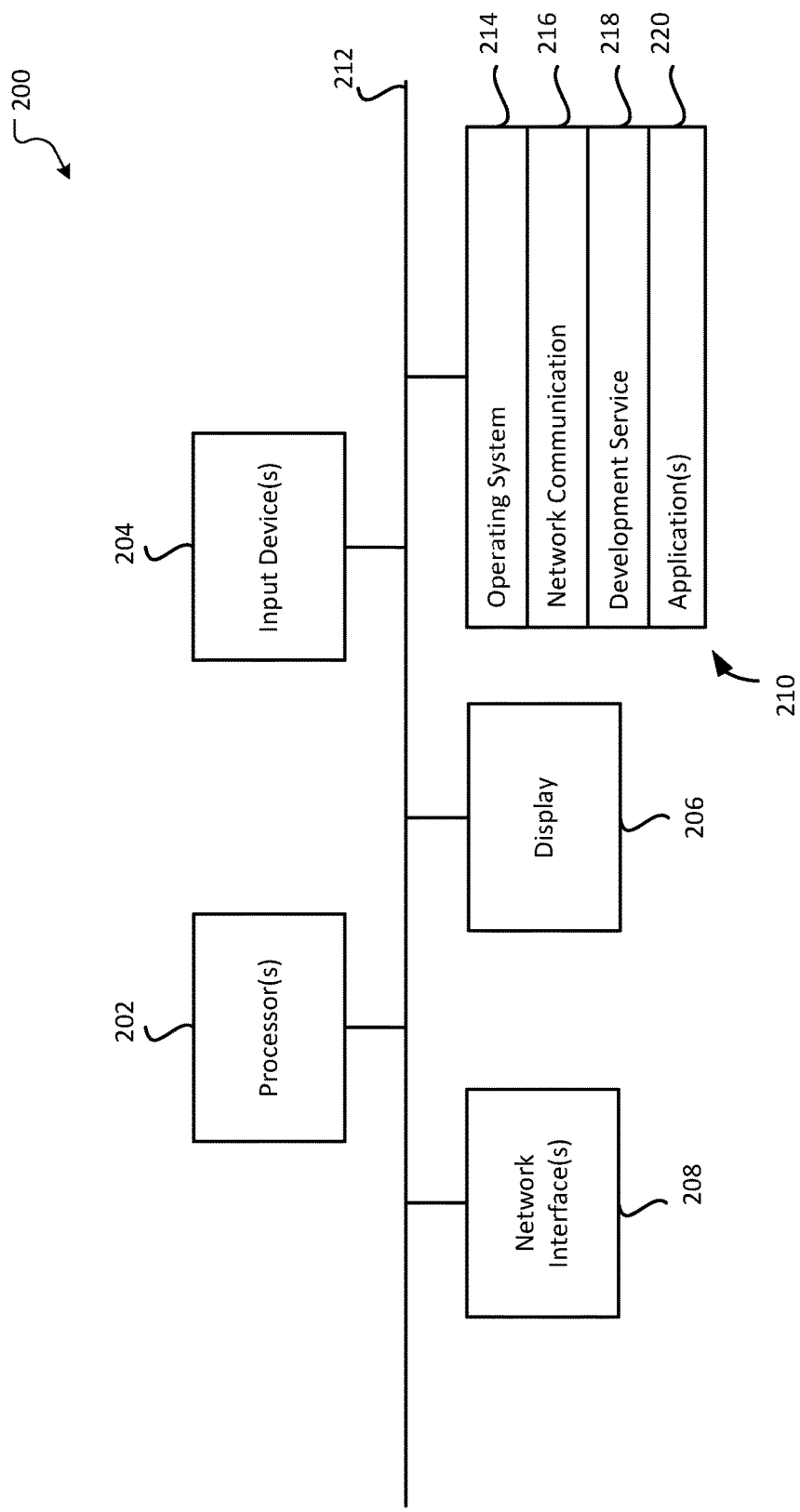
FIG. 2 shows a computing device according to an embodiment of the present disclosure.

FIG. 2 is a block diagram of an example computing device 200 that may implement various features and processes as described herein. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Development service instructions 218 can include instructions that create, edit, and/or test virtual containers for pipeline distribution and implementation as described herein. For example, development service instructions 218 may allow users to create pipelines in containers and test the containers and pipelines in a local development environment.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
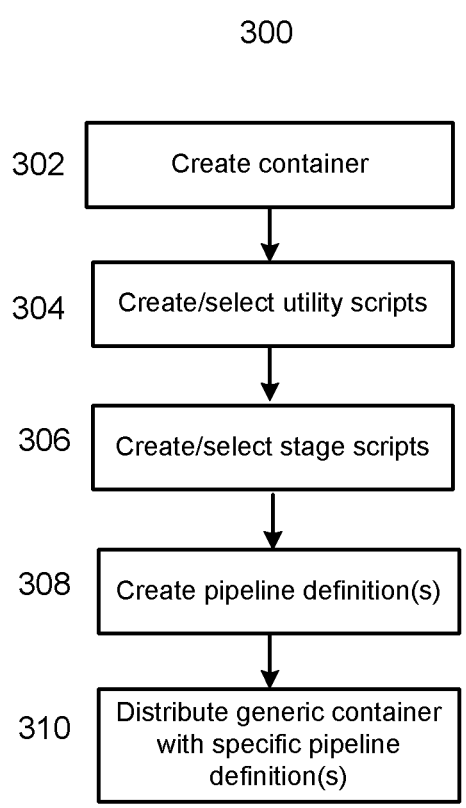
FIG. 3 shows a container creation and distribution process according to an embodiment of the present disclosure.

FIG. 3 shows a container creation and distribution process 300 according to an embodiment of the present disclosure. A computing device 200 including a development environment may perform process 300 to develop and distribute containers 110.

At 302, computing device 200 may create container 110. For example, in response to user input, computing device 200 may create container 110 and store container 110 and/or data defining and/or describing container 110 in memory 210 of computing device 200. In some embodiments, container 110 may be a standard type of container, such as a Docker™ container or other standard container type. In some embodiments, container 110 may be a proprietary and/or custom container type.

At 304, computing device 200 may add utility libraries 120 to container 110 to start building the containerized pipeline. Utility libraries 120 may be stored in and obtained from memory 210 of computing device 200. In some embodiments, computing device 200 may add utility libraries 120 automatically or container 110 may be formed pre-populated with utility libraries 120. In some embodiments, a user may select one or more utility libraries 120 to add to container 110 using a user interface provided by computing device 200. In some embodiments, computing device 200 may provide editing tools allowing a user to create and/or edit utility libraries 120 and save utility libraries 120 in memory 210 of computing device 200.

At 306, computing device 200 may add stage scripts 130 to container 110 to continue building the containerized pipeline. Stage scripts 130 may be stored in and obtained from memory 210 of computing device 200. In some embodiments, a user may select one or more stage scripts 130 to add to container 110 using a user interface provided by computing device 200. In some embodiments, computing device 200 may provide editing tools allowing a user to create and/or edit stage scripts 130 and save stage scripts 130 in memory 210 of computing device 200. For example, stage scripts 130 may be customized for each container 110. In some embodiments, some or all stage scripts 130 may ingest one or more utility libraries 120 in container 110 and/or portions thereof.

At this point, container 110 may include everything required for execution of the pipeline (e.g., all source code). That is, when container 110 is distributed to a CI/CD platform environment, and the environment executes a command to run the program inside container 110, container 110 may be able to provide the pipeline functionality regardless of the environment in which it is deployed.

At 308, computing device 200 may create pipeline definitions and/or build scripts for distribution with container 110. For example, a pipeline definition may indicate a selection of one or more platforms (e.g., Jenkins™, Circle™, Drone™) to which container 110 may be sent. Computing device 110 may create an associated build script for each specific platform. Build scripts may be generated automatically by computing device 110 and/or by editing tools allowing a user to create and/or edit build scripts and save build scripts in memory 210 of computing device 200.

Build scripts may be relatively short and simple sets of code. Additionally, a single build script may be reused for different containerized applications sent to the same CI/CD platform (for example, a build script that directs a platform to execute whatever is in a container may be used with any container). Because the only thing that needs to be customized for each platform is the build script, the overall process of transitioning a pipeline from one platform to another may be simplified. The following are examples of build scripts that may be used for some platforms, illustrating the small amount of code that may be changed from one platform to another, while the bulk of the code (i.e., what is inside container 110) remains the same:

```
JENKINS:
docker.withRegistry('DOCKER-REGISTRY.COM') {
                docker.image('DOCKERIMAGE').inside {{
                        try {
                                '/stages/01_clone.py'
                        }
DRONE CI:
pipeline:
    backend:
        image: DOCKERIMAGE
        commands:
            - '/stages/01_clone.py'
CIRCLE CI:
version: 2
jobs:
    build:
        docker:
            - image: DOCKERIMAGE
        steps:
            - '/stages/01_clone.py'
```

At 310, computing device 200 may distribute container 110 and build script(s) to one or more platforms. For example, computing device 200 may provide container 110 to a local development environment to enable testing of the pipeline within container 110. If the pipeline is ready for distribution (e.g., after a user tests the pipeline in the development environment, or without testing), computing device 200 may use one or more CI/CD platforms to deliver the container 110 and build script(s) to web hosting environments and/or other cloud computing platforms. A platform receiving container 110 and a build script appropriate to the platform may run the build script and thereby execute the pipeline in container 110 and receive a result of that executing for use in the platform environment (e.g., for output to a web user or the like).

The combination of containerized pipeline and platform-specific build script may form a generic pipeline that may be easily distributed to any CI/CD platform. In some embodiments, complex applications may be developed using multiple containers 110 and one or more build scripts causing execution of pipelines in each container 110. For example, a first container 110 may include a Java application, a second container 110 may include a Python application, and a third container may include a .NET application. Each container may be distributed together with a build script to a particular CI/CD platform (e.g., Jenkins). The build script may cause the platform to execute the code inside the appropriate container 110 in the appropriate situation.

Figure 4:
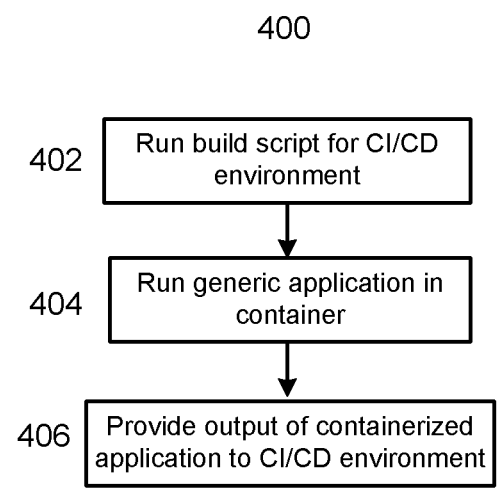
FIG. 4 shows a generic pipeline execution process according to an embodiment of the present disclosure.

FIG. 4 shows a generic pipeline execution process 400 according to an embodiment of the present disclosure. A computing device 200 including a CI/CD environment may perform process 400 to execute pipelines in containers 110. Note that computing device 200 may be, but is not necessarily, the same computing device 200 that performs container creation and distribution process 300. For example, the same pipeline device 200 may perform container creation and distribution process 300 and generic application execution process 400 when container 110 is being tested in the local development environment. In other embodiments, a first computing device 200 may perform container creation and distribution process 300 and thereby deliver container 110 to a second computing device that may perform generic pipeline execution process 400 in a CI/CD environment such as Jenkins™, Circle CI™, Drone CI™, or the like.

At 402, computing device 200 may run a build script generated as described above. The build script may be configured to run in the specific environment of computing device 200 (e.g., Jenkins™, Circle CI™, Drone CI™, etc.). The build script may direct the pipeline in container 110 to execute.

At 404, computing device 200 may run the generic pipeline in container 110. For example, pipeline may execute in response to computing device 200 running the build script. As noted above, the pipeline may be written in a generic language and may contain all code necessary to execute. Accordingly, the pipeline may execute the same way across different computing environments. For example, the pipeline may do the same thing when container 110 is deployed in a Jenkins™ platform as it would when container 110 is employed in a Circle™ platform or a test environment.

At 406, computing device 200 may use the output of pipeline 0execution. For example, container 110 may output a result of execution, and this result may be used in any way an execution result may be used normally in the platform.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of deploying an application, the method comprising:
    creating, by a processor, a virtual container including at least one program that is generically executable in a plurality of different continuous integration and delivery (CI/CD) environments, the creating comprising:
        incorporating at least one stage script into the at least one program, the at least one stage script defining a flow for the at least one program; and
        ingesting at least a portion of at least one utility library including instructions for at least one generic application task during at least one step in the flow of the at least one program;
    creating, by the processor, a separate pipeline definition from a generic pipeline definition for each of the plurality of different CI/CD environments, each pipeline definition indicating the CI/CD environment for which it is created and being configured to operate only in the CI/CD environment for which it is created, and each pipeline definition being configured to cause the CI/CD environment for which it is created to execute the at least one program, wherein transitioning a pipeline from the CI/CD environment for which the at least one of the pipeline definitions is created to another CI/CD environment includes customizing a generic build script for the other CI/CD environment without customizing contents of the virtual container; and distributing, by the processor, at least one of the pipeline definitions.

2. The method of claim 1, wherein the creating of the virtual container further comprises creating the at least one utility library and incorporating the at least one utility library into the at least one program.

3. The method of claim 1, wherein the at least one stage script ingests additional code outside the at least one utility library during at least one step in the flow of the at least one program.

4. The method of claim 1, further comprising creating, by the processor, the at least one stage script.

5. The method of claim 1 wherein, each separate pipeline definition comprises a build script for the CI/CD environment for which the separate pipeline definition is created, the build script being configured to cause the CI/CD environment to cause the at least one program to execute within the virtual container.

6. The method of claim 5, further comprising creating, by the processor, the build script.

7. The method of claim 1, wherein:
at least one of the plurality of different CI/CD environments comprises a local development environment; and
the method further comprises testing, by the processor, the at least one program in the local development environment prior to deploying the at least one program in at least one of the plurality of different CI/CD environments separate from the local development environment.

8. A non-transitory computer-readable medium comprising instructions that, when executed by a processor, cause the processor to deploy at least one application in a particular continuous integration and delivery (CI/CD) environment, the instructions comprising:
application instructions within a virtual container including at least one program that is generically executable in a plurality of different CI/CD environments, the at least one program including at least one stage script defining a flow for the at least one program, the at least one stage script ingesting at least a portion of at least one utility library including instructions for at least one generic application task during at least one step in the flow of the at least one program; and
a selected one of a plurality of separate pipeline definition instructions from a generic pipeline definition for each of the plurality of different CI/CD environments, each pipeline definition indicating the CI/CD environment for which it is created and being configured to operate only in the CI/CD environment for which it is created, and each pipeline definition being configured to cause the CI/CD environment for which it is created to execute the at least one program, wherein transitioning a pipeline from the CI/CD environment for which the at least one of the pipeline definitions is created to another CI/CD environment includes customizing a generic build script for the other CI/CD environment without customizing contents of the virtual container, and wherein the selected one of the plurality of separate pipeline definition instructions corresponds to the particular CI/CD environment.

9. The non-transitory computer-readable medium of claim 8, wherein the instructions further comprise instructions for creating the at least one utility library and incorporating the at least one utility library into the at least one program.

10. The non-transitory computer-readable medium of claim 8, wherein the at least one stage script ingests additional code outside the at least one utility library during at least one step in the flow of the at least one program.

11. The non-transitory computer-readable medium of claim 8, wherein the instructions further comprise instructions for creating the at least one stage script.

12. The non-transitory computer-readable medium of claim 8, wherein each separate pipeline definition comprises a build script for the CI/CD environment for which the separate pipeline definition is configured, the build script being configured to cause the CI/CD environment to cause the at least one program to execute within the virtual container.

13. The non-transitory computer-readable medium of claim 8, wherein:
at least one of the plurality of different CI/CD environments comprises a local development environment; and
the instructions further comprise instructions for testing the at least one program in the local development environment prior to deploying the at least one program in at least one of the plurality of different CI/CD environments separate from the local development environment.

14. An application development device comprising:
a processor; and
a non-transitory memory in communication with the processor, the memory comprising instructions that, when executed by the processor, cause the processor to perform processing comprising:
creating a virtual container including at least one program that is generically executable in a plurality of different continuous integration and delivery (CI/CD) environments, the at least one program including at least one stage script defining a flow for the at least one program, the at least one stage script ingesting at least a portion of at least one utility library including instructions for at least one generic application task during at least one step in the flow of the at least one program;
creating a separate pipeline definition from a generic pipeline definition for each of the plurality of different CI/CD environments, each pipeline definition indicating the CI/CD environment for which it is created and being configured to operate only in the CI/CD environment for which it is created, and each pipeline definition being configured to cause the CI/CD environment for which it is created to execute the at least one program, wherein at least one of the plurality of different CI/CD environments comprises a local development environment configured to test a particular one of the plurality of different CI/CD environments, and wherein transitioning a pipeline from the CI/CD environment for which the at least one of the pipeline definitions is created to another CI/CD environment includes customizing a generic build script for the other CI/CD environment without customizing contents of the virtual container; and
operating the local development environment, the operating comprising testing the at least one program in the local development environment prior to deploying the at least one program in at least one of the plurality of different CI/CD environments separate from the local development environment.

15. The device of claim 14, wherein the instructions further comprise instructions for creating the at least one utility library and incorporating the at least one utility library into the at least one program.

16. The device of claim 14, wherein the at least one stage script ingests additional code outside the at least one utility library during at least one step in the flow of the at least one program.

17. The device of claim 14, wherein the local development environment is configured to enable creation of the at least one stage script for the at least one program.

18. The device of claim 14, wherein the instructions further cause the processor to perform processing comprising deploying at least one of the pipeline definitions along with the virtual container in the CI/CD environment for which the at least one of the pipeline definitions is created, thereby enabling execution of the at least one program within the CI/CD environment for which the at least one of the pipeline definitions is created.

19. The device of claim 14, wherein each separate pipeline definition comprises a build script for the CI/CD environment for which the separate pipeline definition is created, the build script being configured to cause the CI/CD environment to cause the at least one program to execute within the virtual container.

20. The device of claim 19, wherein the local development environment is configured to enable creation of the build script.

* * * * *